(12) United States Patent
Tomaru

(10) Patent No.: US 11,087,224 B2
(45) Date of Patent: Aug. 10, 2021

(54) OUT-OF-VEHICLE COMMUNICATION DEVICE, OUT-OF-VEHICLE COMMUNICATION METHOD, INFORMATION PROCESSING DEVICE, AND COMPUTER READABLE MEDIUM

(71) Applicant: MITSUBISHI ELECTRIC CORPORATION, Tokyo (JP)

(72) Inventor: Yoshihiro Tomaru, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/652,176

(22) PCT Filed: Nov. 15, 2017

(86) PCT No.: PCT/JP2017/041024
§ 371 (c)(1),
(2) Date: Mar. 30, 2020

(87) PCT Pub. No.: WO2019/097595
PCT Pub. Date: May 23, 2019

(65) Prior Publication Data
US 2020/0250553 A1    Aug. 6, 2020

(51) Int. Cl.
*B60Q 1/26* (2006.01)
*G06N 5/04* (2006.01)
(Continued)

(52) U.S. Cl.
CPC .................. *G06N 5/04* (2013.01); *B60Q 1/50* (2013.01); *G01S 13/06* (2013.01); *G01S 17/06* (2013.01);
(Continued)

(58) Field of Classification Search
CPC ........... G06N 5/04; G06N 20/00; H04W 4/44; B60Q 1/50; B60Q 2300/45;
(Continued)

(56) References Cited

U.S. PATENT DOCUMENTS 8,954,252 B1 *   2/2015   Urmson ................. G08G 1/167
                                                          701/70
10,292,136 B2 *  5/2019   Rubin .................... H04W 4/027
(Continued)

FOREIGN PATENT DOCUMENTS

DE    10 2014 215 057 A1    2/2016
DE    10 2014 225 254 A1    6/2016
(Continued)

*Primary Examiner* — Tanmay K Shah
(74) *Attorney, Agent, or Firm* — Birch, Stewart, Kolasch & Birch, LLP

(57) ABSTRACT

An out-of-vehicle communication device includes: a yielding-intention-judgment-parameter learning unit that generates a yielding intention judgment parameter as learning data in which behavior and a position of a pedestrian are associated with the condition of the yielding intention of the pedestrian, and stores the yielding intention judgment parameter in a storage unit; a yielding intention judgment unit that judges yielding intention of an actual pedestrian based on a head image and a position of the actual pedestrian and the yielding intention judgment parameter stored in the storage unit; and a display control unit that determines whether or not to display display content to the actual pedestrian, contents of the display content, and a display position of the display content on a road based on result of the judgment on the actual condition of the yielding intention of the pedestrian and controls a display device based on the determination.

14 Claims, 9 Drawing Sheets

(51) Int. Cl.
- *H04W 4/44* (2018.01)
- *G06N 20/00* (2019.01)
- *B60Q 1/50* (2006.01)
- *G01S 13/06* (2006.01)
- *G01S 17/06* (2006.01)
- *G06F 3/14* (2006.01)
- *G06K 9/00* (2006.01)

(52) U.S. Cl.
CPC ............ *G06F 3/14* (2013.01); *G06K 9/00228* (2013.01); *G06K 9/00335* (2013.01); *G06K 9/00805* (2013.01); *G06N 20/00* (2019.01); *H04W 4/44* (2018.02)

(58) Field of Classification Search
CPC ..... B60Q 2400/50; G01S 13/06; G01S 17/06; G01S 17/86; G01S 17/931; G01S 7/003; G01S 2013/9316; G01S 7/415; G01S 13/931; G01S 13/865; G01S 7/417; G01S 13/867; G06F 3/14; G06K 9/00228; G06K 9/00335; G06K 9/00805; G06K 9/00362; G06K 9/00791; G09G 2354/00; G09G 2380/10; B60R 21/00; G08G 1/16
USPC ......................................................... 340/468
See application file for complete search history.

(56) References Cited

U.S. PATENT DOCUMENTS

| | | | |
|---|---|---|---|
| 2014/0062685 A1* | 3/2014 | Tamatsu ................. | B60Q 5/005 340/425.5 |
| 2019/0031091 A1* | 1/2019 | Haushalter ............... | B60Q 3/10 |

FOREIGN PATENT DOCUMENTS

| | | | | |
|---|---|---|---|---|
| JP | 2005-332297 A | | 12/2005 | |
| JP | 2005332297 A | * | 12/2005 | |
| JP | 2013-114536 A | | 6/2013 | |
| JP | 2013114536 A | * | 6/2013 | |
| JP | 2014-46838 A | | 3/2014 | |
| JP | 2014046838 A | * | 3/2014 | ............... B60Q 1/50 |

* cited by examiner

FIG. 7

NECESSITY DETERMINATION TABLE 32

| CONDITION OF YIELDING INTENTION | NECESSITY OF DISPLAY |
|---|---|
| YIELDING INTENTION PRESENCE | NECESSARY (TO EXPRESS GRATITUDE) |
| YIELDING INTENTION ABSENCE | NECESSARY (TO POLITELY PROMPT WALKING) |
| YIELDING INTENTION UNDECIDED (WAVERING CONDITION) | NECESSARY (TO PROMPT WALKING) |
| CONDITION IN WHICH PEDESTRIAN IS IRRELEVANT TO TRAFFIC | UNNECESSARY |

FIG. 8

CONTENT DB 33

| CONDITION OF YIELDING INTENTION | DISPLAY CONTENT |
|---|---|
| YIELDING INTENTION PRESENCE | Thank you!!   Thanks |
| YIELDING INTENTION ABSENCE | After you   → Please Please → |
| YIELDING INTENTION UNDECIDED (WAVERING) | Do you want to cross?   After you |

CONTENT DB 33

| PROCESSING FOR EACH LEVEL OF UNDERSTANDING | CONDITION OF YIELDING INTENTION | | |
|---|---|---|---|
| | BASIC | CANNOT SEE DISPLAY CONTENT | CANNOT UNDERSTAND CONTENTS |
| YIELDING INTENTION PRESENCE | Thanks | Thanks | Thank you!! |
| | Thank you!! | Thank you!! | Thanks |
| ⋮ | ⋮ | ⋮ | ⋮ |

OUT-OF-VEHICLE COMMUNICATION DEVICE, OUT-OF-VEHICLE COMMUNICATION METHOD, INFORMATION PROCESSING DEVICE, AND COMPUTER READABLE MEDIUM

TECHNICAL FIELD

The present invention relates to an out-of-vehicle communication device and an out-of-vehicle communication method for displaying display content to a pedestrian, an information processing device that constitutes a part of the out-of-vehicle communication device, and an out-of-vehicle communication program that causes a computer to execute the out-of-vehicle communication method.

BACKGROUND ART

There has been proposed a notification device for vehicle that notifies a pedestrian recognized by a recognition device of the recognition by performing irradiation with marking light (see Patent Reference 1, for example). This device judges whether the pedestrian has intention to cross a road (i.e., crossing intention) or not based on the result of detection by a camera. Specifically, this device judges that the pedestrian has the crossing intention in a case where the pedestrian performs a predetermined action (e.g., raising a hand or pointing the face to a certain direction).

PRIOR ART REFERENCE

Patent Reference

Patent Reference 1: Japanese Patent Application Publication No. 2014-46838 (Abstract, Paragraphs 0026, 0068 and 0085, FIG. 16)

SUMMARY OF THE INVENTION

Problem to be Solved by the Invention

However, the aforementioned device is incapable of precisely judging the crossing intention of the pedestrian since the device makes the judgment on the crossing intention of the pedestrian based exclusively on the predetermined action. Therefore, it is impossible to precisely judge whether the pedestrian has intention to yield a way to a vehicle (i.e., yielding intention) or not, and to provide the pedestrian with appropriate information.

The object of the present invention, which has been made to resolve the above-described problem, is to provide an out-of-vehicle communication device and an out-of-vehicle communication method capable of precisely judging a condition of the yielding intention of a pedestrian and displaying appropriate display content to the pedestrian, an information processing device that constitutes a part of the out-of-vehicle communication device, and an out-of-vehicle communication program that causes a computer to execute the out-of-vehicle communication method.

Means for Solving the Problem

An out-of-vehicle communication device according to an aspect of the present invention includes: a yielding-intention-judgment-parameter learning unit that previously learns a relationship among condition of yielding intention as a pedestrian's intention of yielding a way to a vehicle, behavior of a head of the pedestrian and a position of the pedestrian based on a learning database previously generated from a traffic scene and generates a yielding intention judgment parameter as learning data in which the behavior and the position are associated with the condition of the yielding intention; a storage unit that stores the yielding intention judgment parameter; a vicinal situation acquisition unit that acquires a head image and a position of a first pedestrian; a yielding intention judgment unit that judges condition of yielding intention of the first pedestrian based on the acquired head image and position of the first pedestrian and the yielding intention judgment parameter stored in the storage unit; a display device that displays display content on a road; and a display control unit that determines whether or not to display the display content to the first pedestrian, contents of the display content, and a display position of the display content on the road based on result of the judgment on the condition of the yielding intention of the first pedestrian and controls the display device based on the determination.

An out-of-vehicle communication method according to another aspect of the present invention includes: a step of previously learning a relationship among condition of yielding intention as a pedestrian's intention of yielding a way to a vehicle, behavior of a head of the pedestrian and a position of the pedestrian based on a learning database previously generated from a traffic scene, generating a yielding intention judgment parameter as learning data in which the behavior and the position are associated with the condition of the yielding intention, and storing the yielding intention judgment parameter in a storage unit; a step of acquiring a head image and a position of a first pedestrian from a vicinal situation acquisition unit; a step of judging condition of yielding intention of the first pedestrian based on the acquired head image and position of the first pedestrian and the yielding intention judgment parameter stored in the storage unit; and a step of determining whether or not to display display content to the first pedestrian, contents of the display content, and a display position of the display content on a road based on result of the judgment on the condition of the yielding intention of the first pedestrian and controlling a display device, for displaying the display content on the road, based on the determination.

Effect of the Invention

According to the present invention, a condition of the yielding intention of a pedestrian can be judged precisely and appropriate display content can be displayed to the pedestrian.

BRIEF DESCRIPTION OF THE DRAWINGS

FIG. 7 is a diagram showing an example of a necessity determination table used by a display necessity determination unit of the out-of-vehicle communication device according to the first embodiment in a tabular form.

FIG. 8 is a diagram showing an example of a content DB used by a display content determination unit of the out-of-vehicle communication device according to the first embodiment in a tabular form.

MODE FOR CARRYING OUT THE INVENTION

An out-of-vehicle communication device and an out-of-vehicle communication method according to each embodiment of the present invention, an information processing device that constitutes a part of the out-of-vehicle communication device, and an out-of-vehicle communication program that causes a computer to execute the out-of-vehicle communication method will be described below with reference to the accompanying drawings. The out-of-vehicle communication device is provided on a vehicle (e.g., automobile), displays display content to a person (i.e., pedestrian) on a road in the vicinity of the vehicle, and thereby enables communication between the vehicle and the pedestrian. The following embodiments are just examples and a variety of modifications are possible within the scope of the present invention.

(1) First Embodiment (1-1) Configuration
<Out-of-Vehicle Communication Device>

Figure 1:
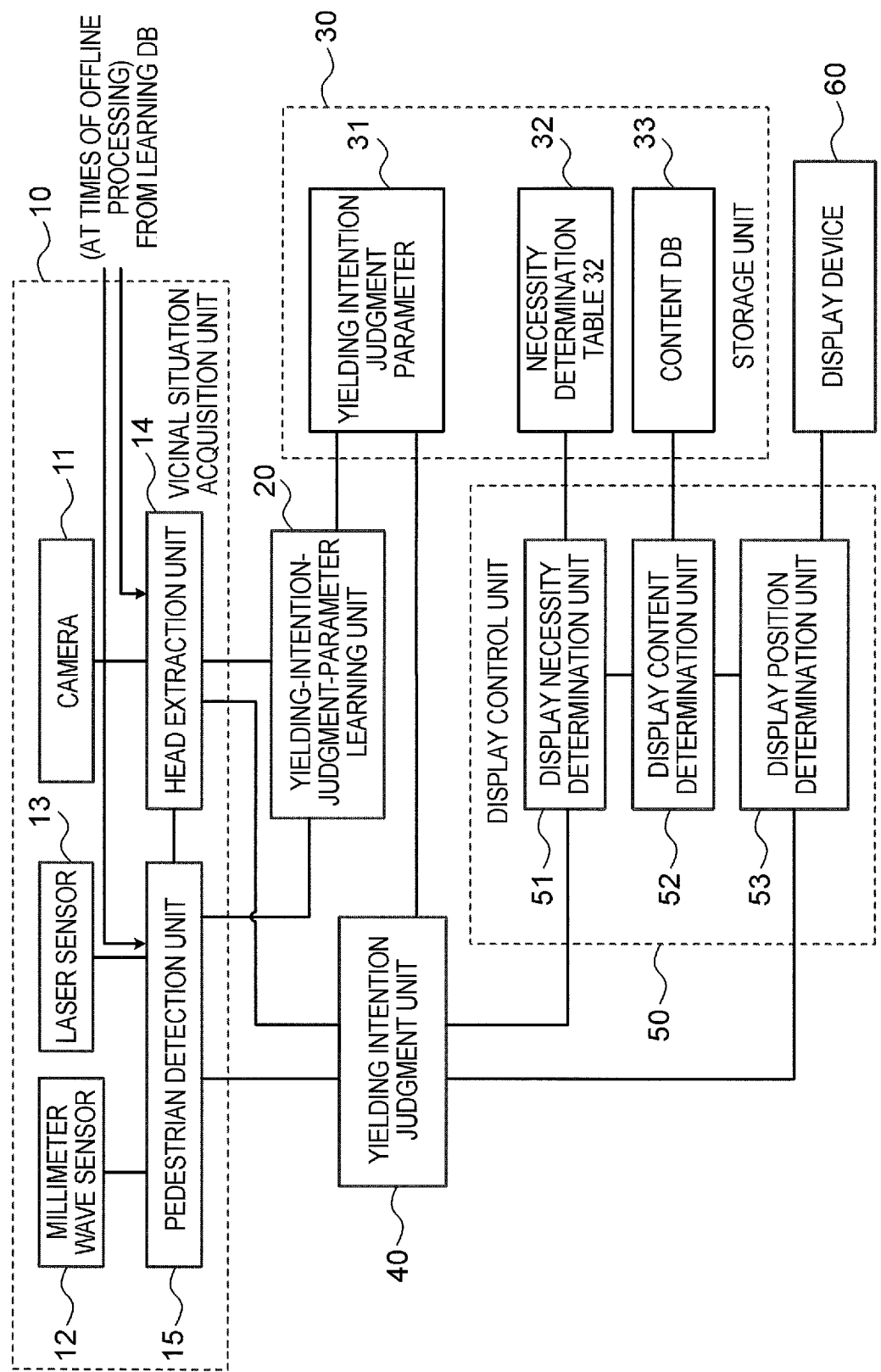
FIG. 1 is a functional block diagram schematically showing the configuration of an out-of-vehicle communication device according to a first embodiment.

FIG. 1 is a functional block diagram schematically showing the configuration of an out-of-vehicle communication device according to a first embodiment. The out-of-vehicle communication device in FIG. 1 is a device capable of executing an out-of-vehicle communication method according to the first embodiment.

As shown in FIG. 1, the out-of-vehicle communication device according to the first embodiment includes a vicinal situation acquisition unit 10 that photographs or detects the situation in the vicinity of the vehicle (e.g., object in the vicinity), a yielding-intention-judgment-parameter learning unit 20 that previously generates yielding intention judgment parameters 31 by means of learning (e.g., machine learning or deep learning) based on a learning database (learning DB) previously generated from a traffic scene, and a storage unit 30 as a storage device that previously stores data such as the yielding intention judgment parameters 31. The yielding-intention-judgment-parameter learning unit 20 is provided in order to generate the yielding intention judgment parameters 31 by means of learning by use of image data and sensor data in the learning DB, and is not used when the out-of-vehicle communication is carried out. Here, the image data in the learning DB are image data obtained by photographing a traffic scene with a camera used for acquiring the learning DB. The sensor data in the learning DB are data obtained by detecting an object in the traffic scene with a millimeter wave sensor or a laser sensor used for acquiring the learning DB.

Further, the out-of-vehicle communication device according to the first embodiment includes a yielding intention judgment unit 40 that judges condition of yielding intention of an actual pedestrian (hereinafter referred to also as a "first pedestrian") in an actual traffic scene (e.g., "yielding intention presence", "yielding intention absence" or "yielding intention undecided"), a display device 60 that displays display content on a road surface, and a display control unit 50 that controls the display device 60.

The "yielding intention presence" is condition in which the pedestrian has intention to let a vehicle pass first and to cross a road after the passage of the vehicle, that is, condition in which the pedestrian has intention to yield a way to the vehicle.

The "yielding intention absence" is condition in which the pedestrian has intention to cross the road before the passage of the vehicle, that is, condition in which the pedestrian does not have the intention to yield a way to the vehicle.

The "yielding intention undecided" is condition in which the pedestrian is wavering on whether to cross the road before the passage of the vehicle or to let the vehicle pass first and to cross the road after the passage of the vehicle, that is, wavering condition.

Figures 13, 14:
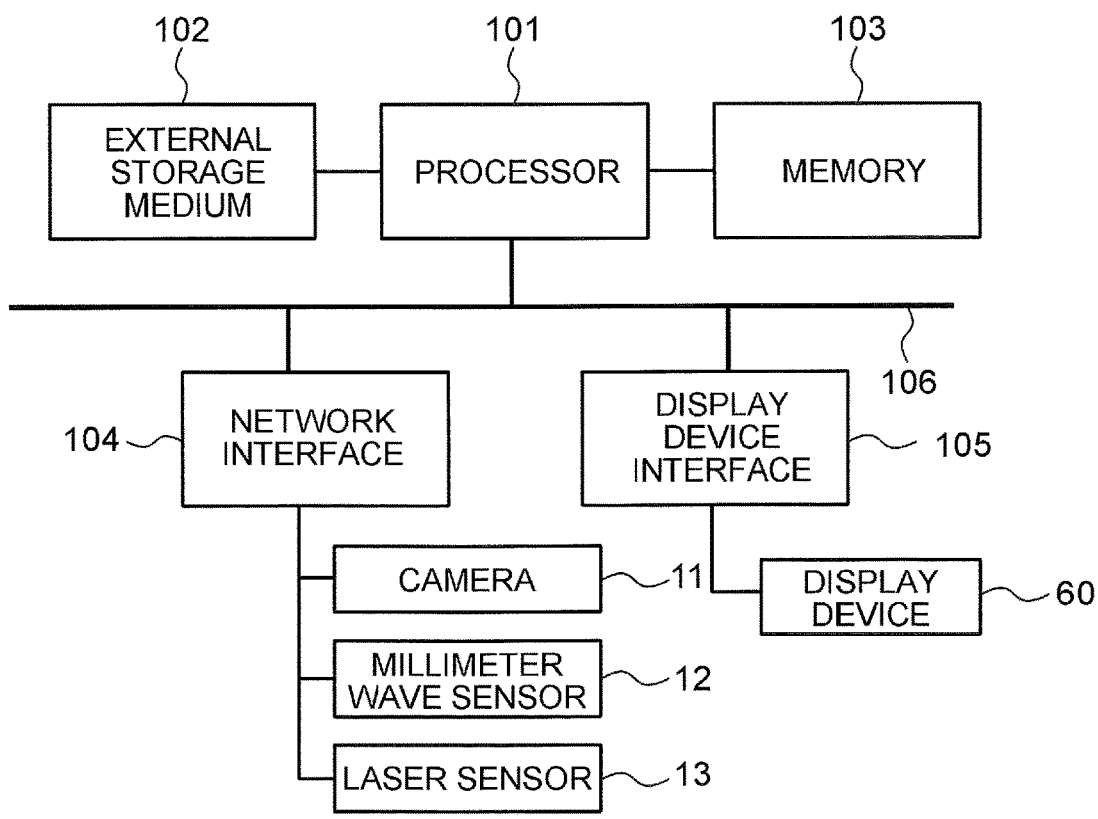
FIG. 13 is a diagram showing an example of a content DB used by a display content change unit of the out-of-vehicle communication device according to the second embodiment in a tabular form.
FIG. 14 is a diagram showing the hardware configuration of an out-of-vehicle communication device according to a modification of the first and second embodiments.

A head extraction unit 14, a pedestrian detection unit 15, the yielding-intention-judgment-parameter learning unit 20, the yielding intention judgment unit 40 and the display control unit 50 constitute an information processing device according to the first embodiment. An example of the hardware configuration of the information processing device is shown in FIG. 14 which will be explained later.

<Vicinal Situation Acquisition Unit 10>

Figure 2:
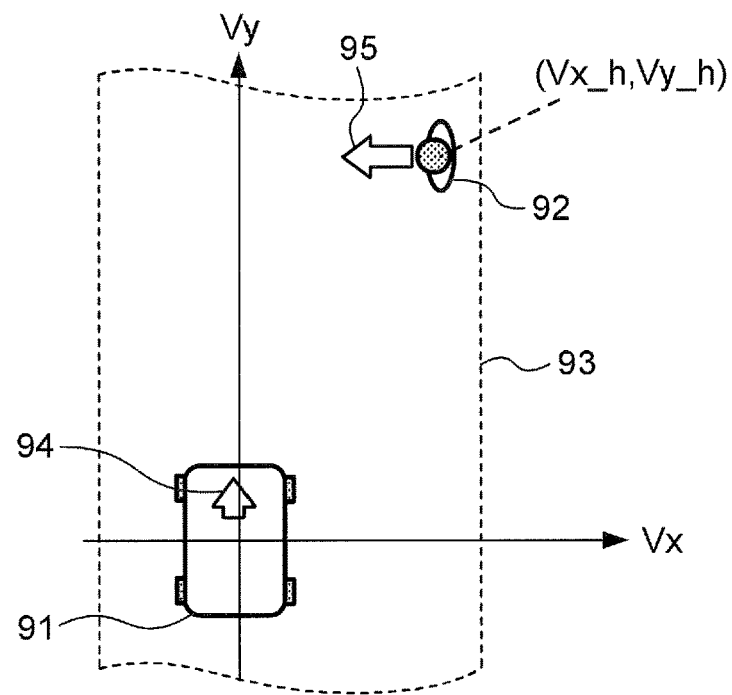
FIG. 2 is a diagram showing an example of a positional relationship between a vehicle equipped with the out-of-vehicle communication device according to the first embodiment and a pedestrian.
Figure 3:
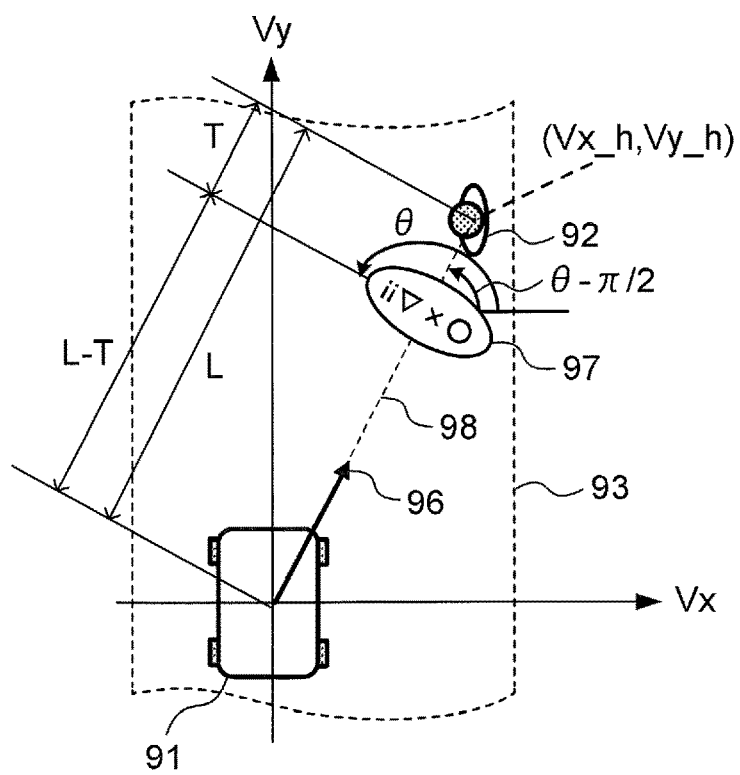
FIG. 3 is a diagram showing an example of the position of the pedestrian with respect to the vehicle and display content displayed on a road.

FIG. 2 is a diagram showing an example of a positional relationship between a vehicle 91 equipped with the out-of-vehicle communication device according to the first embodiment and an actual pedestrian (hereinafter referred to also as a "first pedestrian") 92 who is going to cross a road 93. FIG. 3 is a diagram showing an example of the position of the first pedestrian 92 with respect to the vehicle 91 and display content 97 displayed on the road 93. In FIG. 2 and FIG. 3, the vehicle 91 is situated at the origin (0, 0) of a $V_x$-$V_y$ orthogonal coordinate system, with its front end facing the direction of an arrow 94, namely, a $+V_y$ axis direction. The first pedestrian 92 is situated at coordinates ($V_{x\_h}$, $V_{y\_h}$) with his/her face pointed in the direction of an arrow 95, namely, a $-V_x$ axis direction, and is crossing the road 93 by walking in the $-V_x$ axis direction or is standing still while wanting to cross the road 93.

The vicinal situation acquisition unit 10 is a means for acquiring a head image of the first pedestrian 92 in the vicinity of the vehicle 91 and the position of the first pedestrian 92. In the first embodiment, the vicinity of the vehicle 91 is a region in front of the vehicle 91, namely, a region in the direction of the arrow 94 and within a predetermined angular range.

In the example of FIG. 1, the vicinal situation acquisition unit 10 includes a camera 11 that captures an image, a millimeter wave sensor 12 and a laser sensor 13 that detect the position of the first pedestrian 92 as an object, a head extraction unit 14 that extracts the head image of the first pedestrian 92 from the image captured by the camera 11, and a pedestrian detection unit 15 that detects the position of the first pedestrian 92 based on sensor data provided from the millimeter wave sensor 12 and the laser sensor 13. The head of the first pedestrian 92 includes the face of the first pedestrian 92. In a case where the camera 11 has a distance measurement function, the position of the first pedestrian 92 may be measured based on an image of the first pedestrian 92 (e.g., head image) captured by the camera 11. The position of the first pedestrian 92 can be determined by the distance L from the vehicle 91 to the first pedestrian 92 and the direction of the first pedestrian 92 as viewed from the vehicle 91 (arrow 96). The millimeter wave sensor 12 detects the position of the object by using a millimeter wave. The millimeter wave sensor 12 is referred to also as a millimeter wave radar. The laser sensor 13 detects the position of the object by using a laser beam. The vicinal situation acquisition unit 10 is not limited to the configuration shown in FIG. 1 as long as the unit is a means capable of acquiring the head image of the first pedestrian 92 and the position of the first pedestrian 92.

<Yielding-Intention-Judgment-Parameter Learning Unit 20>

The yielding-intention-judgment-parameter learning unit 20 is used for generating the yielding intention judgment parameters 31 and storing the yielding intention judgment parameters 31 in the storage unit 30 before the out-of-vehicle communication device according to the first embodiment is used in an actual traffic scene. The yielding-intention-judgment-parameter learning unit 20 is used in a state in which the camera 11 in FIG. 1 is disconnected from the head extraction unit 14 and the millimeter wave sensor 12 and the laser sensor 13 are disconnected from the pedestrian detection unit 15. Processing in this state is referred to as offline processing. The yielding-intention-judgment-parameter learning unit 20 previously learns a relationship among the condition of the yielding intention as the intention of the pedestrian to yield a way to a vehicle, behavior of the head of the pedestrian and the position of the pedestrian based on the learning DB previously generated from a traffic scene, generates the yielding intention judgment parameters 31 as learning data in which the "behavior of the head of the pedestrian" and the "position of the pedestrian" are associated with the "condition of the yielding intention", and stores the yielding intention judgment parameters 31 in the storage unit 30.

The behavior of the head of the pedestrian can be judged by extracting the direction of the face of the pedestrian, the change in the face direction, the time for which the face direction is maintained at a fixed direction, the pedestrian's line of sight, the pedestrian's facial expression, a combination of some of these, or the like, from chronological image data. The change in the face direction can include movement of the head for pedestrian's checking the passing of a vehicle, movement of the head when the pedestrian bows, and so forth.

The condition of the yielding intention includes, for example, one or more of the "yielding intention presence" that appears when the pedestrian has the yielding intention, the "yielding intention absence" that appears when the pedestrian does not have the yielding intention, and the "yielding intention undecided", that is, the "wavering condition" that appears when the pedestrian is wavering on whether to yield a way to a vehicle or to cross the road first.

<Storage Unit 30>

The storage unit 30 storing the yielding intention judgment parameters 31 can be formed with a semiconductor memory, a hard disk drive, or the like. In addition to the yielding intention judgment parameters 31, the storage unit 30 previously stores a necessity determination table 32 in which necessity information indicating whether displaying the display content is necessary or not is associated with the "condition of the yielding intention" and a content database (content DB) 33 in which display content is associated with the condition of the yielding intention. The yielding intention judgment parameters 31, the necessity determination table 32 and the content DB 33 may be respectively stored in a plurality of storage units different from each other.

<Yielding Intention Judgment Unit 40>

The yielding intention judgment unit 40 judges the yielding intention of the first pedestrian 92 based on the head image of the first pedestrian 92, the position of the first pedestrian 92, and the yielding intention judgment parameters 31 stored in the storage unit 30. The yielding intention of the first pedestrian 92 includes one or more of the "yielding intention presence" that appears when the first pedestrian 92 has the yielding intention, the "yielding intention absence" that appears when the first pedestrian 92 does not have the yielding intention, and the "yielding intention undecided", that is, the "wavering condition" that appears when the first pedestrian 92 is wavering on whether to yield a way to a vehicle or to cross the road first.

<Display Device 60>

The display device 60 is a device that displays the display content 97 on the surface of the road 93. The display device 60 is, for example, a projector that projects an image.

<Display Control Unit 50>

The display control unit 50 determines whether or not to display the display content to the first pedestrian 92, the contents of the display content and the display position of the display content on the road 93 based on the result of the judgment on the condition of the yielding intention of the first pedestrian 92 and controls the display device 60 based on the determination.

The display control unit 50 includes a display necessity determination unit 51 that determines whether to display the display content or not based on the necessity determination table 32 stored in the storage unit 30. Further, the display control unit 50 includes a display content determination unit 52 that determines the display content based on the content DB 33 stored in the storage unit 30. Furthermore, the display control unit 50 includes a display position determination unit 53 that controls the display device 60 so that the display content 97 is displayed at a position on a line segment 98 connecting the vehicle 91 and the first pedestrian 92. The display position determination unit 53 controls the display device 60 so that a lower part of a character included in the display content is situated close to the first pedestrian 92 and an upper part of the character is situated far from the first pedestrian 92.

(1-2) Operation

The operation of the out-of-vehicle communication device includes the offline processing (FIG. 4 which will be explained later) of performing the learning by using the learning DB in order to generate the yielding intention judgment parameters 31 and online processing (FIG. 6 which will be explained later) of making the judgment on the condition of the yielding intention of the first pedestrian 92 in an actual traffic scene and displaying the display content. The learning DB is a set of chronological image data and chronological sensor data acquired by mounting a camera, a millimeter wave sensor and a laser sensor for the acquisition of the learning DB on a vehicle for the acquisition of the learning DB and photographing and detecting a pedestrian for a time of some seconds to some tens of seconds in an experimental environment assuming an actual traffic scene. The yielding intention judgment parameters 31 are generated before the out-of-vehicle communication device is used in an actual traffic scene, and are stored in the storage unit 30.

Further, the chronological image data and the chronological sensor data in the learning DB are associated with the conditions of the yielding intention of the pedestrian such as the "yielding intention presence", the "yielding intention absence" and the "yielding intention undecided" and behavior of the pedestrian such as "pedestrian is irrelevant to the traffic on the road". Incidentally, the method of acquiring the chronological image data and the chronological sensor data in the learning DB can be selected freely and there is no limitation on the amount of the data or the method of the acquisition as long as the data are those according to an actual traffic scene. Further, the millimeter wave sensor 12, the laser sensor 13 and the camera 11 mounted on the vehicle 91 have previously been calibrated. Thus, the out-of-vehicle communication device has already acquired information indicating mounting positions and mounting directions of the millimeter wave sensor 12, the laser sensor 13 and the camera 11 with respect to the vehicle 91.

<Offline Processing>

Figure 4:
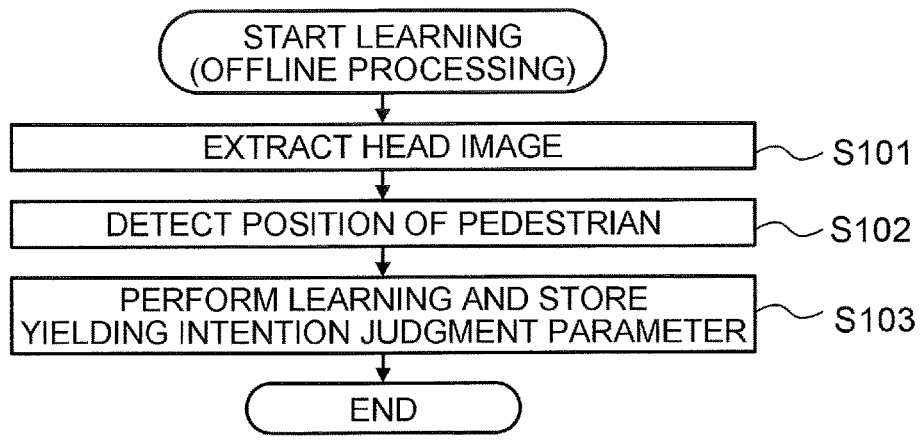
FIG. 4 is a flowchart showing a learning operation (performed by offline processing) by a yielding-intention-judgment-parameter learning unit of the out-of-vehicle communication device according to the first embodiment.

FIG. 4 is a flowchart showing a learning operation performed by the yielding-intention-judgment-parameter learning unit 20 of the out-of-vehicle communication device according to the first embodiment. In the learning operation, the chronological sensor data in the learning DB prepared in advance are inputted to the pedestrian detection unit 15 and the chronological image data in the learning DB in advance prepared are inputted to the head extraction unit 14.

In the learning operation, the head extraction unit 14 extracts a head of the pedestrian from an image based on the learning DB by means of trimming (step S101). The extraction of the head can be carried out by a method using Histograms of Oriented Gradients (HOG), a method using an already learned neural network such as Single Shot MultiBox Detector (SSD), or the like.

Subsequently, the pedestrian detection unit 15 detects the position of the pedestrian on the road with reference to the vehicle based on the sensor data in the learning DB (step S102).

Subsequently, correspondence a relationship between the position of the head of the pedestrian in the image which is acquired by the head extraction unit 14 and a position which is acquired by detecting the head of the pedestrian with the millimeter wave sensor 12 or the laser sensor 13 is calculated. Since the millimeter wave sensor 12, the laser sensor 13 and the camera 11 have already been calibrated, coordinate transformation is possible between an image coordinate system in the image acquired by the photographing by the camera 11 and a sensor coordinate system obtained with the millimeter wave sensor 12 and the laser sensor 13. Position information of high accuracy can be obtained by taking the average of the position of the pedestrian on the road determined from a detection signal from the millimeter wave sensor 12 and the position of the pedestrian on the road determined from a detection signal from the laser sensor 13. By this method, a data set as a set of chronological head images and chronological positions on the road can be acquired from the learning DB.

Subsequently, the yielding-intention-judgment-parameter learning unit 20 performs the learning based on the acquired data set. The model used for the learning may be any model such as a neural network using LSTM (Long Short-Term Memory), and the hidden Markov model (HMM) as long as a classification problem can be solved based on chronological data. Irrespective of what model is used, the learning may be performed by inputting the chronological head images and the chronological positions of the pedestrian on the road and giving tags as the behavior of the pedestrian as output training data. Parameters for the model obtained through the learning are stored in the storage unit 30 as the yielding intention judgment parameters 31 (step S103).

Figure 5:
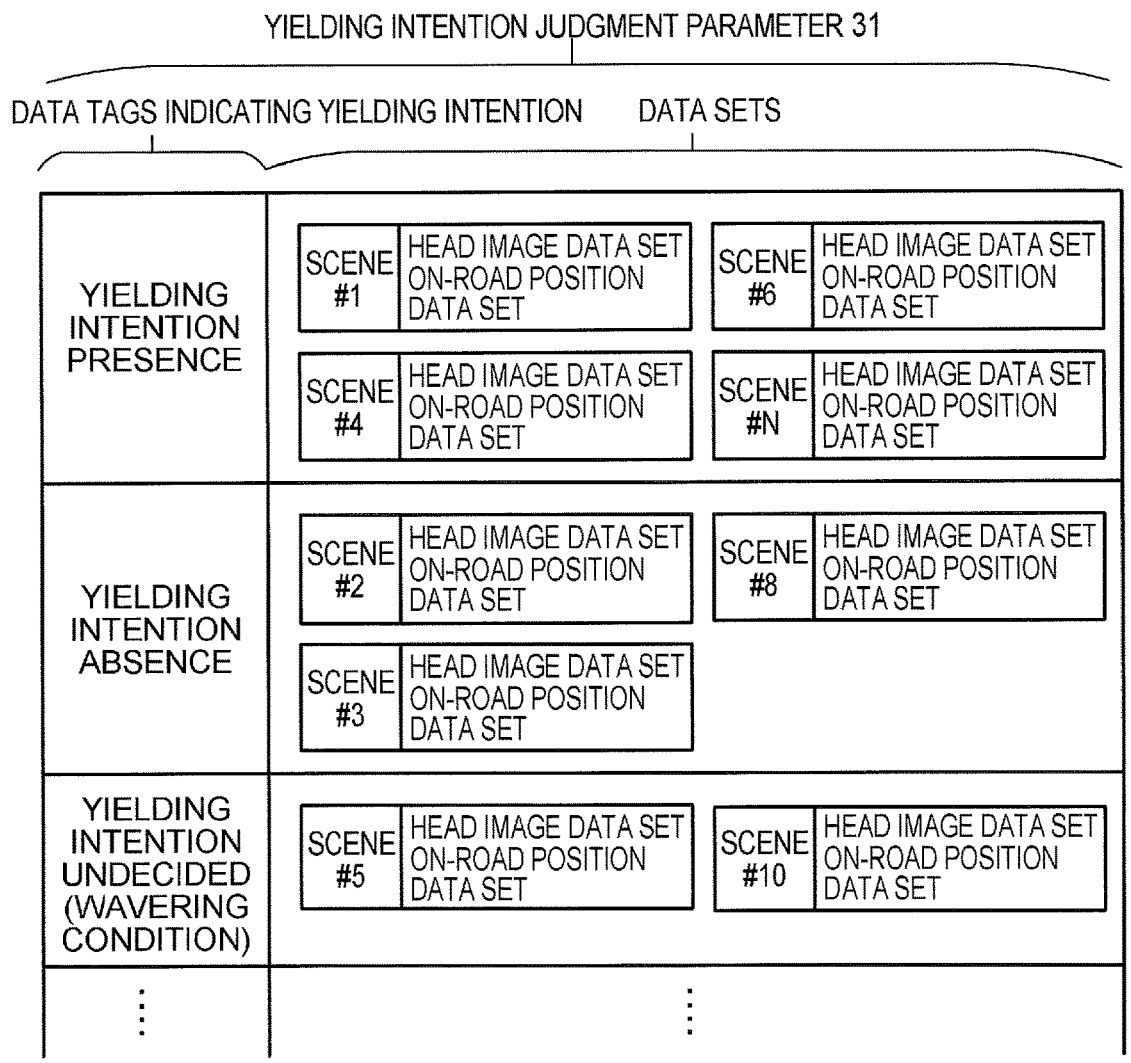
FIG. 5 is a diagram showing an example of yielding intention judgment parameters stored in a storage unit in a tabular form.

FIG. 5 is a diagram showing an example of the yielding intention judgment parameter 31 stored in the storage unit 30 in a tabular form. In the yielding intention judgment parameters 31, tagging based on the behavior of the pedestrian has been done. In FIG. 5, "yielding intention presence", "yielding intention absence" and "yielding intention undecided" have been prepared as data tags indicating the yielding intention of the pedestrian, and data sets of scenes #N (N: integer larger than or equal to 1) have been associated with their respective data tags. In FIG. 5, a data set of one scene includes a head image data set made up of chronological head image data and an on-road position data set made up of chronological position data on the road.

<Online Processing>

Figure 6:
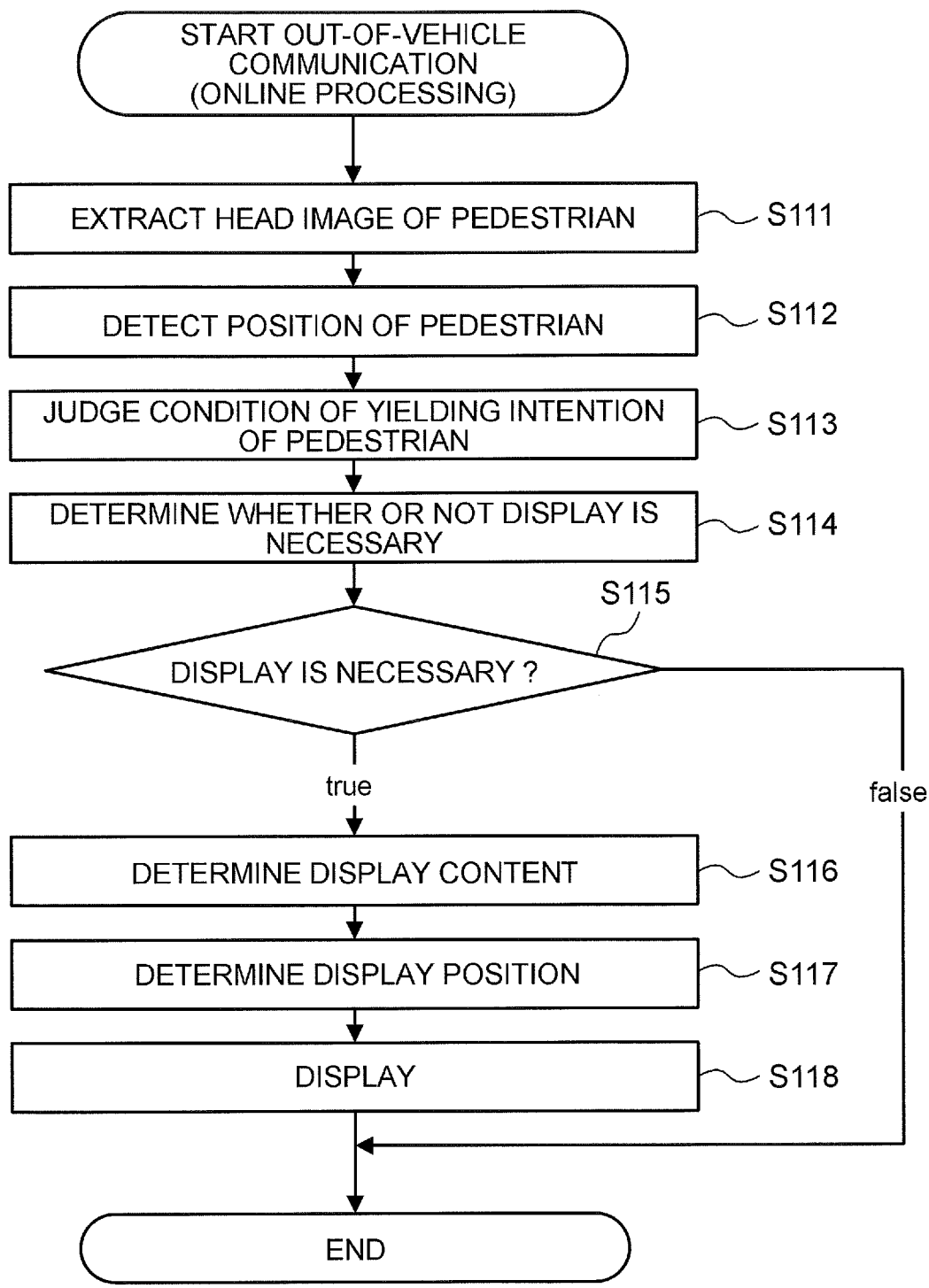
FIG. 6 is a flowchart showing an out-of-vehicle communication operation (performed by online processing) by the out-of-vehicle communication device according to the first embodiment in an actual traffic scene.

FIG. 6 is a flowchart showing an out-of-vehicle communication operation (performed by the online processing) by the out-of-vehicle communication device according to the first embodiment in an actual traffic scene. In the out-of-vehicle communication operation, the chronological sensor data of the millimeter wave sensor 12 and the laser sensor 13 are inputted to the pedestrian detection unit 15 and the chronological image data captured by the camera 11 are inputted to the head extraction unit 14.

First, the head extraction unit 14 extracts the head of the first pedestrian 92 from an image captured by the camera 11 provided on the vehicle 91 (step S111). Then, the pedestrian detection unit 15 calculates the position of the first pedestrian 92 on the road from values of the sensor data of the millimeter wave sensor 12 and the laser sensor 13 performing the sensing and the position of the head of the first pedestrian 92 in the image (step S112). This process is the same as that in the offline processing.

Subsequently, the yielding intention judgment unit 40 judges the condition of the yielding intention of the first pedestrian 92 by using the head image of the first pedestrian 92 and the position of the first pedestrian 92 on the road (step S113). This can be calculated by inputting the head image of the pedestrian and the position of the first pedestrian 92 on the road to the model to which the learned yielding intention judgment parameters 31 have been applied. Incidentally, the behavior of the first pedestrian 92 obtained here is any one of the tags already registered in the learning DB.

Subsequently, the display necessity determination unit 51 determines whether it is necessary to display the display content to the first pedestrian 92 or not based on the behavior of the first pedestrian 92 (steps S114 and S115). Whether the display of the display content to the first pedestrian 92 is necessary or not is determined based on the previously generated necessity determination table 32. For example, when the behavior of the first pedestrian 92 is behavior of the "yielding intention presence", it is determined that the display is necessary in order to express gratitude to the first pedestrian 92, that is, the display is determined to be "necessary". When the behavior of the first pedestrian 92 is "pedestrian is irrelevant to the traffic", that is, for a person just standing in the vicinity of a crossing with no intention of crossing the road, the display is determined to be unnecessary. Namely, the necessity determination table 32 has been generated so that the display becomes "unnecessary" for such behavior.

FIG. 7 is a diagram showing an example of the necessity determination table 32 used by the display necessity determination unit 51 of the out-of-vehicle communication device according to the first embodiment in a tabular form. In a case where the display is judged to be "unnecessary" in the step S115 as shown in FIG. 7, the process is ended. In a case where the display is judged to be "necessary", the display content determination unit 52 determines the display content for the first pedestrian 92 based on the content DB 33 (step S116). In the determination of the display content, display content corresponding to the behavior of the first pedestrian 92 judged by the yielding intention judgment unit 40 is selected from the content DB 33 which is a previously generated set of multiple pieces of content respectively associated with behavior of the pedestrian.

FIG. 8 is a diagram showing an example of the content DB 33 used by the display content determination unit 52 of the out-of-vehicle communication device according to the first embodiment in a tabular form. As shown in FIG. 8, it is also possible to prepare multiple pieces of display content corresponding to certain behavior of the first pedestrian 92 in the content DB 33. In such cases, the content DB 33 may be formed so that a selection can be made based on the age, race, sex, etc. of the first pedestrian 92. A publicly known method can be employed as the method for identifying the age, race, sex, etc. of the first pedestrian 92.

Subsequently, the display position determination unit 53 determines the display position and angle of the display content (step S117). Here, a $+V_y$ axis direction in a $V_x$–$V_y$ coordinate system having its origin at the center of a rectangle circumscribed around the vehicle 91 corresponds to a coordinate axis in the traveling direction.

In order to display the display content between the first pedestrian 92 and the vehicle 91 as shown in FIG. 3, the display position $(V_{x\_d}, V_{y\_d})$ and the display angle $\theta$ can be determined by using the following calculation expressions.

$$(v_{x\_d}, V_{y\_d}) = (V_{x\_h} * R, V_{y\_h} * R)$$

$$\theta = \arctan\left(\frac{V_{y\_h}}{V_{x\_h}}\right) + \frac{\pi}{2}$$

In the above expressions, the following relation exists.

$$\begin{cases} L = \sqrt{V_{x\_h}^2 + V_{y\_h}^2} \\ R = \frac{L-T}{L} \end{cases}$$

Here, T is the distance from the first pedestrian 92 to the display content 97 and has previously been set at an appropriate distance (e.g., T=3 meters).

FIG. 3 shows an example of the position of the first pedestrian 92 with respect to the vehicle 91 and the display content 97 displayed on the road 93. The display control unit 50 has the display content displayed on the surface of the road 93 according to the display position and the display angle, by which the process is ended (step S118). In a case where the vehicle 91 passes first in the situation of FIG. 3, content corresponding to "Thanks" in FIG. 8 can be used as the display content 97. In a case where the vehicle 91 passes after the first pedestrian 92 crosses the road in the situation of FIG. 3, content corresponding to "After you" in FIG. 8 can be used as the display content 97. In a case where the vehicle 91 is uncertain of the first pedestrian 92's intention to cross the road in the situation of FIG. 3, content corresponding to "Do you want to cross?" in FIG. 8 can be used as the display content 97.

(1-3) Effect

As described above, the out-of-vehicle communication device according to the first embodiment automatically learns rules from chronological data indicating behavior of the pedestrian and the tags associated with the chronological data and thereby generates the yielding intention judgment parameters 31 as learning data. In a case where the out-of-vehicle communication device is used in an actual traffic scene, the condition of the yielding intention of the first pedestrian 92 is judged based on the yielding intention judgment parameters 31, and thus the condition of the yielding intention can be judged more precisely compared to a case where only rules previously determined by a person are used. Accordingly, display content having appropriate contents can be displayed to the first pedestrian 92 at an appropriate display position.

Further, since the condition of the yielding intention of the first pedestrian 92 can be judged precisely, it is possible to cancel the display of the display content when the display of the display content is unnecessary according to the yielding intention of the first pedestrian 92. Accordingly, display that lowers emotional gain of the first pedestrian 92 by displaying unnecessary display content can be inhibited.

(2) Second Embodiment (2-1) Configuration
<Out-of-Vehicle Communication Device>

The out-of-vehicle communication device according to the above-described first embodiment determines whether or not to display the display content to the first pedestrian 92 (steps S114 and S115 in FIG. 6), determines the contents of the display content (step S116 in FIG. 6) and determines the display position of the display content on the road 93 (step S117 in FIG. 6) based on the result of the judgment on the condition of the yielding intention of the first pedestrian 92 (steps S111 to S113 in FIG. 6) and controls the display device 60 based on these determinations (step S118 in FIG. 6).

However, there are cases where the first pedestrian 92 cannot understand the display content displayed on the road 93 by the display device 60 or cannot visually recognize the display content displayed on the road 93.

Therefore, an out-of-vehicle communication device according to a second embodiment judges the pedestrian's level of understanding of the display content, and when the pedestrian cannot understand the display content, the out-of-vehicle communication device changes the display content to new display content so that the first pedestrian 92 can understand the display content.

Figure 9:
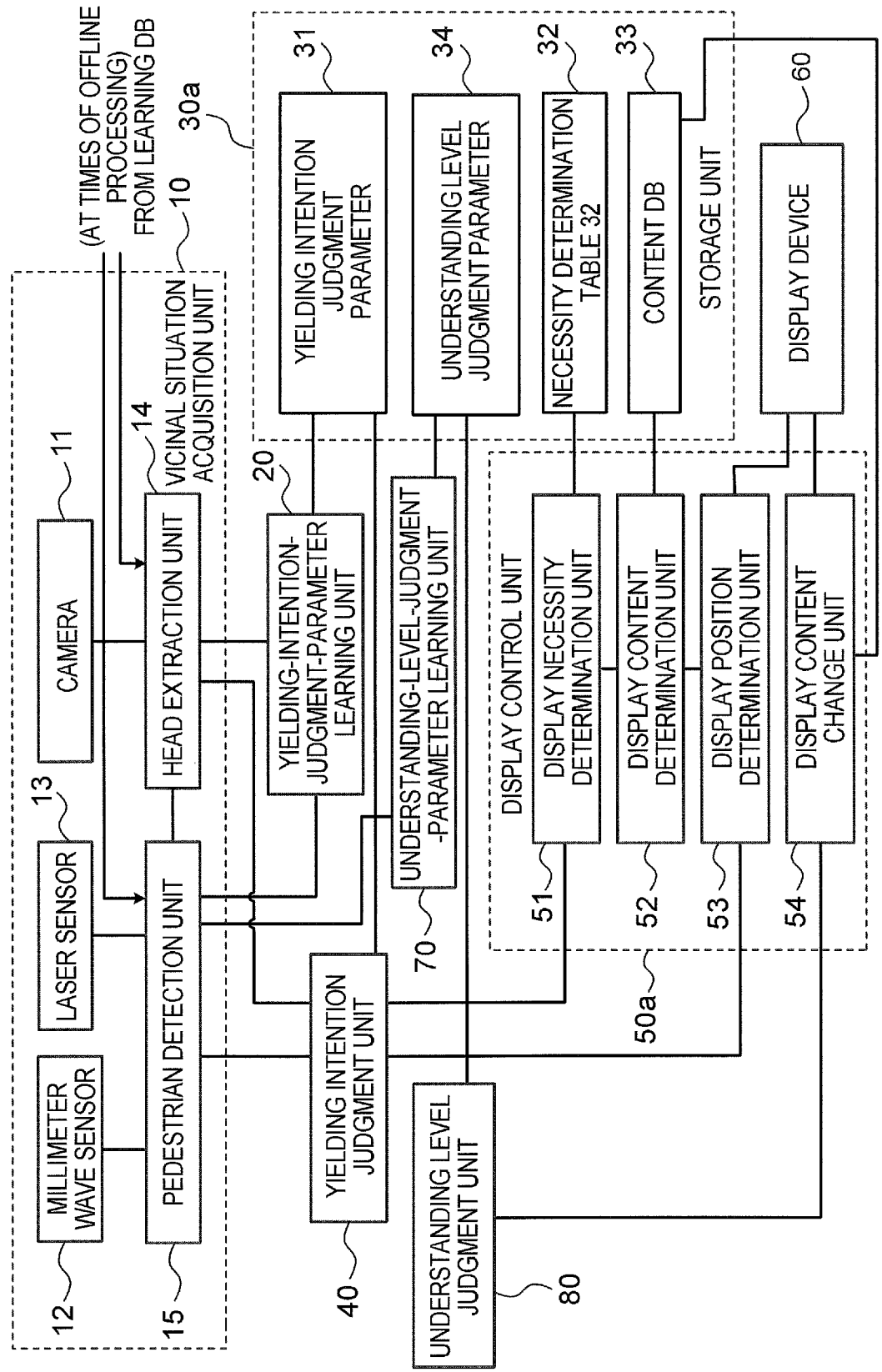
FIG. 9 is a functional block diagram schematically showing the configuration of an out-of-vehicle communication device according to a second embodiment.

FIG. 9 is a functional block diagram schematically showing the configuration of the out-of-vehicle communication device according to the second embodiment. In FIG. 9, each component identical or corresponding to a component shown in FIG. 1 is assigned the same reference character as in FIG. 1. The out-of-vehicle communication device in FIG. 9 is a device capable of executing an out-of-vehicle communication method according to the second embodiment. FIG. 2 and FIG. 3 are also referred to in the description of the second embodiment.

The out-of-vehicle communication device according to the second embodiment differs from the out-of-vehicle communication device according to the first embodiment in including an understanding-level-judgment-parameter learning unit 70 that generates an understanding level judgment parameter 34, an understanding level judgment unit 80 that judges the first pedestrian 92's level of understanding of the display content by using the understanding level judgment parameter 34, and a display content change unit 54.

The understanding-level-judgment-parameter learning unit 70 previously learns a relationship among the pedestrian's level of understanding of the display content displayed on the road 93, behavior of the head of the pedestrian and the position of the pedestrian, generates the understanding level judgment parameters 34 as learning data in which the behavior of the head of the pedestrian and the position of the pedestrian are associated with the level of understanding, and stores the understanding level judgment parameter 34 in a storage unit 30*a*.

The behavior of the head of the pedestrian associated with the level of understanding in the understanding level judgment parameter 34 includes one or more of behavior that appears in a case where the pedestrian has understood the display content, behavior that appears in a case where the pedestrian cannot understand the display content, and behavior that appears in a case where the pedestrian cannot visually recognize the display content. As the behavior that appears in a case where the pedestrian has understood the display content, there is behavior in which the pedestrian moves the head and nods, for example. As the behavior that appears in a case where the pedestrian cannot understand the display content, there are, for example, behavior in which the pedestrian inclines the head, an interrogative expression appearing on the face of the pedestrian, and so forth. As the behavior that appears in a case where the pedestrian cannot visually recognize the display content, there is behavior in which the pedestrian tries to see a part of the display content hidden behind an obstacle by moving the head horizontally and vertically, for example.

The understanding level judgment unit 80 judges the first pedestrian 92's level of understanding of the display content based on the head image of the first pedestrian 92 and the position of the first pedestrian 92 acquired by the vicinal situation acquisition unit 10 and the understanding level judgment parameter 34 stored in the storage unit 30*a*. The display control unit 50 determines whether changing the currently displayed display content is necessary or not based on the result of the judgment on the first pedestrian 92's level of understanding of the display content and controls the display device 60 based on the determination of the necessity of the change. Except for the above-described features, the configuration of the out-of-vehicle communication device in the second embodiment is the same as that in the first embodiment.

(2-2) Operation

The out-of-vehicle communication device according to the second embodiment executes offline processing for generating the yielding intention judgment parameters 31 and generating the understanding level judgment parameters 34 and online processing of providing the display content to the first pedestrian 92 based on the judgment on the yielding intention and the judgment on the level of understanding in the actual traffic scene. In the second embodiment, a learning DB similar to that in the first embodiment is used in the offline processing. Further, the millimeter wave sensor, the laser sensor and the camera are assumed to have already been calibrated. It is also assumed that there has previously been prepared a learning DB for learning the level of understanding, as a set of chronological image data and chronological sensor data acquired with a camera, a millimeter wave sensor and a laser sensor mounted on a vehicle by detecting a pedestrian for a period of some seconds to some tens of seconds in an experimental environment in which an actual traffic scene is assumed. It is also assumed that each piece of data is associated with the pedestrian's level of understanding such as "having understood" the display content, "cannot understand the contents" of the display content, "cannot see the display content" or "not looking at" the display content.

<Offline Processing>

Figure 10:
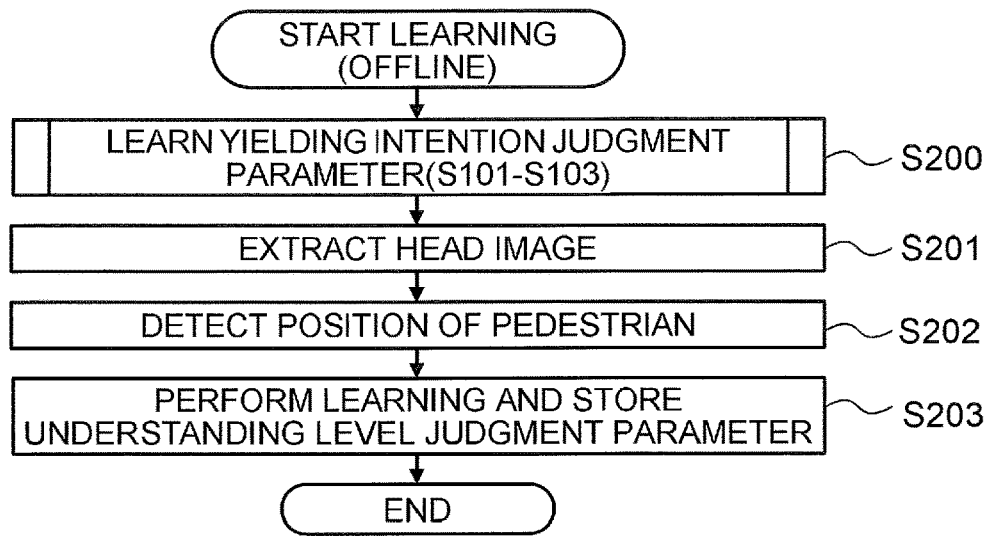
FIG. 10 is a flowchart showing a learning operation (performed by offline processing) by an understanding-level-judgment-parameter learning unit of the out-of-vehicle communication device according to the second embodiment.

FIG. 10 is a flowchart showing a learning operation (performed by offline processing) by the understanding-level-judgment-parameter learning unit 70 of the out-of-vehicle communication device according to the second embodiment.

The learning of the yielding intention judgment parameters 31 (step S200) is the same as the offline processing in the first embodiment.

Subsequently, the learning for generating the understanding level judgment parameters 34 is carried out. First, the head extraction unit 14 extracts the head of the pedestrian from all images in an understanding level learning DB by means of trimming (step S201). The extraction of the head of the pedestrian can be carried out by a publicly known method similarly to the case of the learning of the yielding intention judgment parameters 31.

Subsequently, the pedestrian detection unit 15 detects the position of the pedestrian on the road with reference to the position of the vehicle based on all the sensor data in the understanding level learning DB (step S202). For this process, a publicly known method can be used similarly to the case of the learning of the yielding intention judgment parameters 31. By these processes, a set of chronological head image data and chronological position data on the road can be acquired from the understanding level learning DB.

Figure 11:
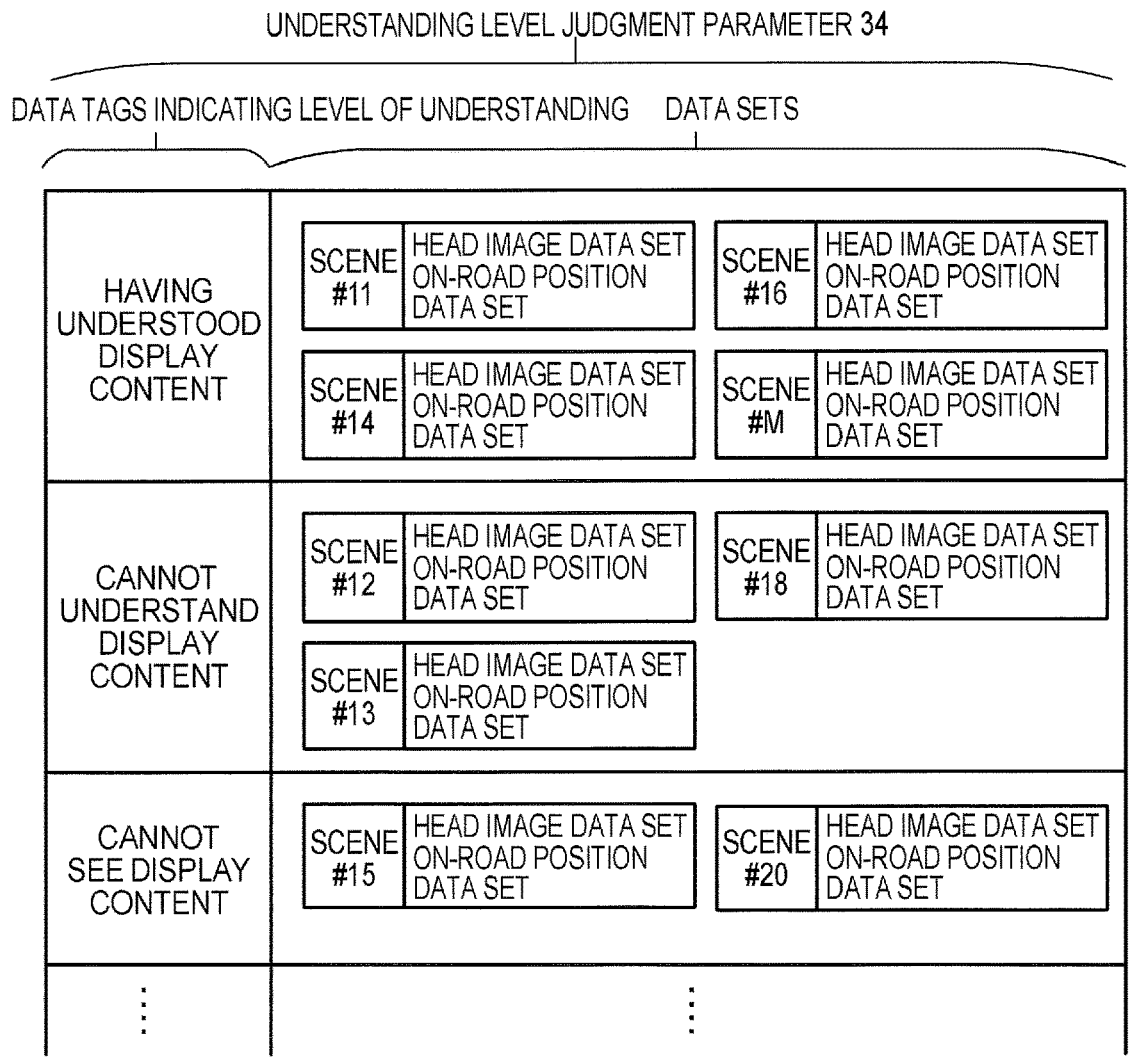
FIG. 11 is a diagram showing an example of understanding level judgment parameters stored in a storage unit in a tabular form.

FIG. 11 is a diagram showing an example of the understanding level judgment parameter 34 stored in the storage unit 30*a* in a tabular form. Since tagging based on the pedestrian's level of understanding has previously been done on the data in the understanding level learning DB, an organizable data set is generated as shown in FIG. 11.

Subsequently, the understanding-level-judgment-parameter learning unit 70 performs the learning based on the generated data set (step S203). The model used for the learning may be any model such as a neural network using LSTM, a model using the hidden Markov model, or the like as long as a classification problem can be solved based on chronological data. Irrespective of what model is used, the learning may be performed by inputting the chronological head image data and the position data of the pedestrian on the road and giving tags indicating the level of understanding as output training data. Parameters for the model obtained by the learning are stored in the storage unit 30a as the understanding level judgment parameters 34 (step S203).

<Online Processing>

Figure 12:
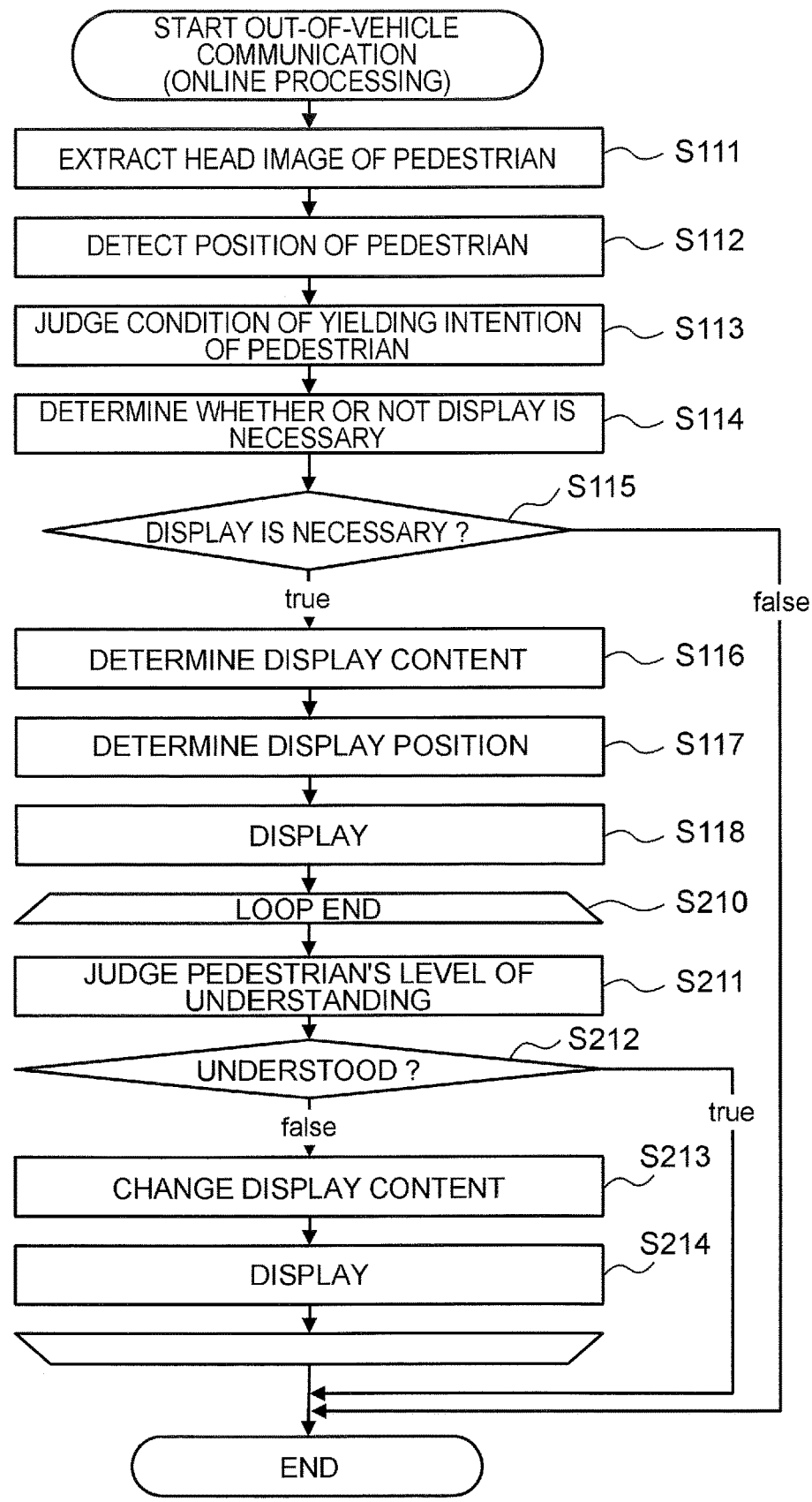
FIG. 12 is a flowchart showing an out-of-vehicle communication operation (performed by online processing) by the out-of-vehicle communication device according to the second embodiment in an actual traffic scene.

FIG. 12 is a flowchart showing an out-of-vehicle communication operation (performed by the online processing) by the out-of-vehicle communication device according to the second embodiment in an actual traffic scene. In FIG. 12, each process step equivalent to a process step shown in FIG. 6 is assigned the same step number as in FIG. 6. In FIG. 12, the processing in steps S111 to S118 is the same as that in FIG. 6.

Subsequently, the understanding level judgment unit 80 judges the first pedestrian 92's level of understanding of the display content for the first pedestrian 92 by using the head image data of the first pedestrian 92 provided from the head extraction unit 14 and the position data of the first pedestrian 92 on the road provided from the pedestrian detection unit 15 (step S211). This judgment can be calculated by applying the head image data of the first pedestrian and the position data of the first pedestrian 92 on the road 93 to the model to which the understanding level judgment parameters 34 acquired through the learning in the offline processing have been applied. The level of understanding obtained through this process is any one of the tags already registered in the understanding level learning DB, e.g., any one of the "DATA TAGS INDICATING LEVEL OF UNDERSTANDING" shown in the left column of FIG. 11.

In step S212, when the result of the judgment is "having understood" the display content, the process is ended without changing the display content (the already displayed display content is not changed).

When the result of the judgment is other than having understood the display content in the step S212, the display content change unit 54 changes the display content (step S213). The display content change unit 54 may select display content different from the previously displayed display content from the display content in the content DB 33 corresponding to the behavior of the first pedestrian 92 provided from the yielding intention judgment unit 40. For example, in a case where the behavior of the first pedestrian 92 indicates the "yielding intention presence" and "Thanks" in FIG. 8 has been selected as the display content and already displayed, the display content may be changed to "Thank you!!" that is display content not displayed yet. While the new display content can be selected randomly as in this example, it is possible to provide the first pedestrian 92 with more appropriate new display content by previously associating each piece of content for respective behavior of the pedestrian in the content DB 33 to a pertinent level of understanding.

FIG. 13 is a diagram showing an example of the content DB 33 used by the display content change unit 54 of the out-of-vehicle communication device according to the second embodiment in a tabular form. For example, if the content DB 33 has been prepared corresponding to multiple types of understanding levels as shown in FIG. 13, in a case where the level of understanding is judged in the understanding level judgment to be "cannot see the display content", i.e., "cannot visually recognize" when the behavior of the first pedestrian 92 is the "yielding intention presence" and basic display content "Thanks" has been displayed, the display can be changed to display of "Thanks" with inverted bright and dark regions that belongs to the item of "yielding intention presence" and corresponds to "cannot see the content". By changing the display content to new display content as in this example, the situation in which the pedestrian cannot see the display content can be eliminated.

In a case where the level of understanding is "cannot see the display content" again in the understanding level judgment after changing the display content, the same process may be repeated until the level of understanding changes to "having understood".

(2-3) Effect

As described above, the out-of-vehicle communication device according to the second embodiment automatically learns rules from chronological data indicating behavior of the pedestrian and the tags associate with the chronological data and thereby generates the understanding level judgment parameters 34 as learning data. Then, the out-of-vehicle communication device judges the first pedestrian 92's level of understanding by using the understanding level judgment parameters 34 and changes the display content to new display content depending on the level of understanding of the display content. Accordingly, it is possible to precisely provide information to the first pedestrian 92.

(3) Modification

FIG. 14 is a diagram showing the hardware configuration of an out-of-vehicle communication device according to the first and second embodiments. As shown in FIG. 14, this out-of-vehicle communication device includes a processor 101, an external storage medium 102 as a storage device, a memory 103 as another storage device, a network interface 104, and a display device interface 105. These components are connected to each other directly or via a data bus 106. The camera 11, the millimeter wave sensor 12 and the laser sensor 13 are connected to the data bus 106 via the network interface 104. The display device 60 is connected to the data bus 106 via the display device interface 105.

The out-of-vehicle communication device according to the first embodiment can be implemented by a device (e.g., computer) using the memory 103 storing an out-of-vehicle communication program as software and the processor 101 executing the program stored in the memory 103. The out-of-vehicle communication program can be acquired by downloading via the Internet, or from a storage medium storing the out-of-vehicle communication program. In this case, the storage unit 30 in FIG. 1 corresponds to the memory 103 or the external storage medium 102 in FIG. 14. Further, all or part of the head extraction unit 14, the pedestrian detection unit 15, the yielding-intention-judgment-parameter learning unit 20, the yielding intention judgment unit 40 and the display control unit 50 in FIG. 1 can be implemented by the memory 103 shown in FIG. 14 and the processor 101 executing a program.

The out-of-vehicle communication device according to the second embodiment can be implemented by a device (e.g., computer) using the memory 103 storing an out-of-vehicle communication program and the processor 101 executing the program stored in the memory 103. In this case, the storage unit 30a in FIG. 9 corresponds to the memory 103 or the external storage medium 102 in FIG. 14. Further, all or part of the head extraction unit 14, the pedestrian detection unit 15, the yielding-intention-judgment-parameter learning unit 20, the yielding intention judgment unit 40, the display control unit 50a, the understanding-level-judgment-parameter learning unit 70 and the understanding level judgment unit 80 in FIG. 9 can be implemented by the memory 103 shown in FIG. 14 and the processor 101 executing a program.

Furthermore, the out-of-vehicle communication devices described above can be mounted on various types of vehicles traveling on a road on which a pedestrian progresses.

Moreover, the display position of the display content is not limited to a position on the line segment 98 connecting the vehicle 91 and the first pedestrian 92; it is also possible to detect the direction of the first pedestrian 92's line of sight and thereby display the display content on a road surface situated on the line of sight.

DESCRIPTION OF REFERENCE CHARACTERS

10: vicinal situation acquisition unit, 11: camera, 12: millimeter wave sensor, 13: laser sensor, 14: head extraction unit, 15: pedestrian detection unit, 20: yielding-intention-judgment-parameter learning unit, 30, 30a: storage unit, 31: yielding intention judgment parameter, 32: necessity determination table, 33: content DB, 34: understanding level judgment parameter, 40: yielding intention judgment unit, 50, 50a: display control unit, 60: display device, 70: understanding-level-judgment-parameter learning unit, 80: understanding level judgment unit.

What is claimed is:

1. An out-of-vehicle communication method comprising:
   previously learning a relationship among condition of yielding intention as a pedestrian's intention of yielding a way to a vehicle, behavior of a head of the pedestrian and a position of the pedestrian based on a learning database previously generated from a traffic scene, generating a yielding intention judgment parameter as learning data in which the behavior and the position are associated with the condition of the yielding intention, and storing the yielding intention judgment parameter in a storage unit;
   acquiring a head image and a position of a first pedestrian from a vicinal situation acquisition unit;
   a step of judging condition of yielding intention of the first pedestrian based on the acquired head image and position of the first pedestrian and the yielding intention judgment parameter stored in the storage unit; and
   determining whether or not to display display content to the first pedestrian, contents of the display content, and a display position of the display content on a road based on result of the judgment on the condition of the yielding intention of the first pedestrian and controlling a display device, for displaying the display content on the road, based on the determination.

2. A non-transitory computer readable medium storing an out-of-vehicle communication program that causes a computer to execute:
   a process of previously learning a relationship among condition of yielding intention as a pedestrian's intention of yielding a way to a vehicle, behavior of a head of the pedestrian and a position of the pedestrian based on a learning database previously generated from a traffic scene, generating a yielding intention judgment parameter as learning data in which the behavior and the position are associated with the condition of the yielding intention, and storing the yielding intention judgment parameter in a storage unit;
   a process of acquiring a head image and a position of a first pedestrian from a vicinal situation acquisition unit;
   a process of judging condition of yielding intention of the first pedestrian based on the acquired head image and position of the first pedestrian and the yielding intention judgment parameter stored in the storage unit; and
   a process of determining whether or not to display display content to the first pedestrian, contents of the display content, and a display position of the display content on a road based on result of the judgment on the condition of the yielding intention of the first pedestrian and controlling a display device, for displaying the display content on the road, based on the determination.

3. An out-of-vehicle communication device comprising:
   a display device that displays display content on a road;
   a processor to execute a program; and
   a memory to store the program which, when executed by the processor, performs
   a process of previously learning a relationship among condition of yielding intention as a pedestrian's intention of yielding a way to a vehicle, behavior of a head of the pedestrian and a position of the pedestrian based on a learning database previously generated from a traffic scene, generating a yielding intention judgment parameter as learning data in which the behavior and the position are associated with the condition of the yielding intention, and storing the yielding intention judgment parameter in the memory;
   a process of acquiring a head image and a position of a first pedestrian;
   a process of judging condition of yielding intention of the first pedestrian based on the acquired head image and position of the first pedestrian and the yielding intention judgment parameter stored in the memory; and
   a process of determining whether or not to display the display content to the first pedestrian, contents of the display content, and a display position of the display content on the road based on result of the judgment on the condition of the yielding intention of the first pedestrian and controlling the display device, for displaying the display content on the road, based on the determination.

4. The out-of-vehicle communication device according to claim 3, wherein the behavior associated with the condition of the yielding intention in the yielding intention judgment parameter includes one or more of:
   behavior in a case of yielding intention presence that appears at the head of the pedestrian in a case where the pedestrian has the yielding intention,
   behavior in a case of yielding intention absence that appears at the head of the pedestrian in a case where the pedestrian does not have the yielding intention, and
   behavior in a case of yielding intention undecided that appears at the head of the pedestrian in a case where the pedestrian is wavering on whether to yield a way to a vehicle or to cross a road first.

5. The out-of-vehicle communication device according to claim 3, wherein the yielding intention judgment parameter is the learning data in which a data set including a head image data set made up of chronological head images of the pedestrian and a position data set made up of chronological positions corresponding to the chronological head images is associated with the condition of the yielding intention.

6. The out-of-vehicle communication device according to claim 3, wherein the condition of the yielding intention of the first pedestrian is judged based on the head image and the position of the first pedestrian and the yielding intention judgment parameter stored in the memory.

7. The out-of-vehicle communication device according to claim 3, wherein
   the memory previously stores a necessity determination table in which necessity information indicating whether displaying the display content is necessary or not is associated with the condition of the yielding intention, and whether to display the display content or not is determined based on the necessity determination table.

8. The out-of-vehicle communication device according to claim 3, wherein the memory previously stores a content database in which the display content is associated with the condition of the yielding intention, and the display content to be displayed is determined based on the content database.

9. The out-of-vehicle communication device according to claim 3, wherein the display device is controlled so that the display content is displayed at a position on a line segment connecting the vehicle and the first pedestrian.

10. The out-of-vehicle communication device according to claim 9, wherein the display device is controlled so that a lower part of a character included in the display content is situated close to the first pedestrian and an upper part of the character is situated far from the first pedestrian.

11. The out-of-vehicle communication device according to claim 3, wherein the program, when executed by the processor, further performs a process of previously learning a relationship among pedestrian's level of understanding of the display content displayed on the road, the behavior of the head of the pedestrian and the position of the pedestrian based on an understanding level learning database that is previously generated, generating an understanding level judgment parameter as learning data in which the behavior and the position are associated with the level of understanding, and storing the understanding level judgment parameter in the memory; and a process of judging first pedestrian's level of understanding of the display content based on the acquired head image and position of the first pedestrian and the understanding level judgment parameter stored in the memory, wherein whether changing the currently displayed display content is necessary or not is determined based on result of the judgment on the first pedestrian's level of understanding.

12. The out-of-vehicle communication device according to claim 11, wherein the behavior associated with the level of understanding in the understanding level judgment parameter includes one or more of:

behavior that appears at the head of the pedestrian in a case where the pedestrian understands the display content, behavior that appears at the head of the pedestrian in a case where the pedestrian cannot understand the display content, and behavior that appears at the head of the pedestrian in a case where the pedestrian cannot visually recognize the display content.

13. The out-of-vehicle communication device according to claim 12, wherein in a case where that the first pedestrian cannot understand the display content is judged, new display content is determined and the display device is controlled based on the new display content.

14. An information processing device used in a vehicle equipped with a vicinal situation acquisition unit that acquires a head image and a position of a first pedestrian and a display device that displays display content on a road, comprising:

a processor to execute a program; and a memory to store the program which, when executed by the processor, performs a process of previously learning a relationship among condition of yielding intention as a pedestrian's intention of yielding a way to a vehicle, behavior of a head of the pedestrian and a position of the pedestrian based on a learning database previously generated from a traffic scene, generating a yielding intention judgment parameter as learning data in which the behavior and the position are associated with the condition of the yielding intention, and storing the yielding intention judgment parameter in the memory;

a process of judging condition of yielding intention of the first pedestrian based on the head image and the position of the first pedestrian acquired from the vicinal situation acquisition unit and the yielding intention judgment parameter stored in the memory; and a process of determining whether or not to display the display content to the first pedestrian, contents of the display content, and a display position of the display content on the road based on result of the judgment on the condition of the yielding intention of the first pedestrian and controlling the display device based on the determination.

* * * * *